Patented Dec. 28, 1926.

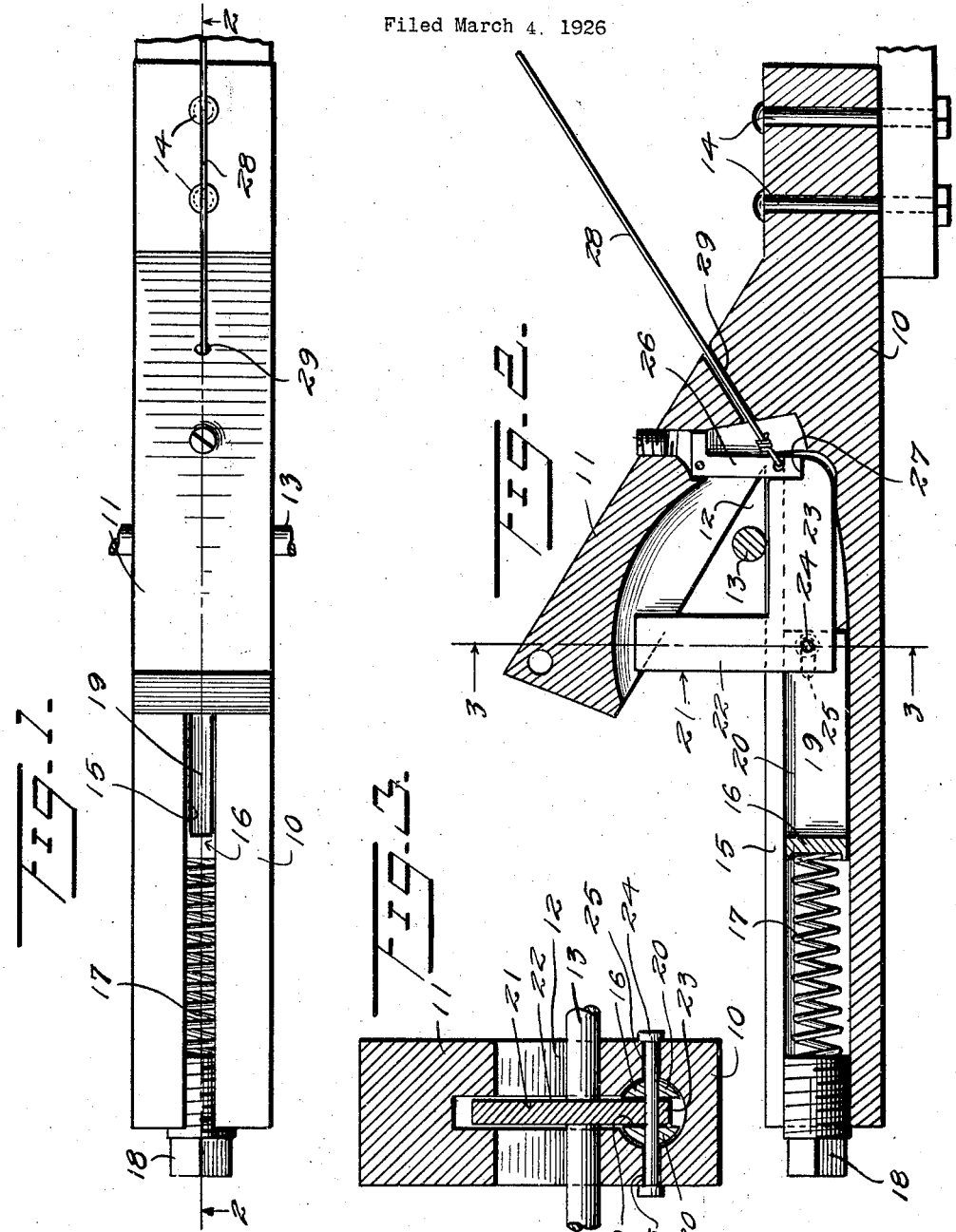

1,612,198

UNITED STATES PATENT OFFICE.

DANIEL E. MAGEE, OF WEBSTER, SOUTH DAKOTA, ASSIGNOR OF ONE-SIXTH TO GUSTAVE F. HOBERG AND ONE-SIXTH TO LAURA N. STAIRG, BOTH OF WEBSTER, SOUTH DAKOTA.

HITCH.

Application filed March 4, 1926. Serial No. 92,300.

This invention relates to hitches and more particularly to a hitch for use in connecting agricultural implements to tractors and the like.

An important object of the invention is to produce a device of this character which automatically releases when the drawn implement meets with any obstruction, such as would cause breakage thereof.

A further object of the invention is to produce a hitch which permits the backing of the implement and in which the coupling of the tractor with the implement may be accomplished by simply backing the tractor to the implement and properly guiding the hitch.

A further object of the invention is to produce a device of this character which will be readily manually released.

These and other objects I attain by the construction shown in the accompanying drawings, wherein for the purpose of illustration is shown a preferred embodiment of my invention and wherein:—

Figure 1 is a plan view of a hitch constructed in accordance with my invention;

Figure 2 is a longitudinal sectional view therethrough on the line 2—2 of Figure 1;

Figure 3 is a section on the line 3—3 of Figure 2.

Referring now more particularly to the drawings, the numeral 10 indicates a bar-like body member through which, at a point adjacent the forward end thereof, a branch 11 diverges rearwardly at an acute angle thereto. This branch combines with the body to provide a fork 12 for the reception of a draw bar pin 13 of the drawn implement. The forward end of the draw bar is adapted, as at 14, for attachment to the tractor. The bar 10 rearwardly of the branch is provided with a longitudinally extending slot 15 within which is mounted a block 16 which is urged toward the forward end of the bar 10 by a spring 17, the tension of which may be adjusted by means of a seat 18 for the rear end of the spring, having threaded engagement with the bar 10. The pressure block 16 has a slot 19 formed therein producing spaced arms 20 between the forward ends of which is pivoted an L-shaped keeper 21, the arms of which are designated at 22 and 23 respectively. The pivot 24 connecting the keeper 21 and arms 20 has an end thereof extended into a slot 25 formed in the body of the draw bar 10 and extending longitudinally thereof so that this pivot acts as a means to define the limits of movement of the pressure block 16 and the keeper 21. The keeper 21 may be rotated about the pivot to move the arm 22 thereof into the slot 19 between the arms of the pressure block or to move the arm 23 into substantial alignment with the pressure block.

When the arm 23 is moved to this position, it is held against return movement by a spring-pressed latch 26 seated within the body of the draw bar at the junction between the main bar 10 and branch 11. The end of this latch swings into a notch 27 formed in the outer end of the arm 23 and may be withdrawn from the notch to permit the keeper to rotate by means of a flexible element 28 extending through a bore 29 formed in the body of the hitch. The arm 23 may also be released from the latch by withdrawing the pressure block longitudinally against the action of the spring 17 until the end of the arm 23 clears the spring latch 26.

In attaching the hitch, the arm 22 is aligned with the pressure block so that the arm 23 extends across the fork 12. The tractor is then backed to the implement so that the draw bar pin 13 of the implement engages against the arm 23, causing the same to rotate about its pivot until it aligns with the pressure block 16 and the arm 22 is extended across the fork, closing the fork against withdrawal of the draw bar pin. The latch 26 locks the keeper 21 in this position until released by the flexible element 28 or until the drawn implement meets with some obstruction and thereby increases the strain against the pressure block to an extent where it will move rearwardly against the action of the spring 17 and permit the arm 23 to be released from the latch while the latch is still in its locking position. It will be obvious that a device of this character may be very cheaply and readily produced, will be durable and efficient in service and a general improvement in the art.

Since the construction hereinbefore set forth is capable of a certain range of change and modification without materially departing from the spirit of the invention, I do not limit myself to such specific structure except as hereinafter claimed.

I claim:—

1. In a hitch, a body having a fork, a block carried by one of the arms of the fork and spring urged toward the base of the fork, an L-shaped keeper pivoted to the block and swingable to align either arm thereof with the block and to place the other arm in a position where it bridges the space between the arms of the fork and a latch engaging one of said arms when aligned with the block to hold the keeper against rotation and from which the keeper is releasable by bodily moving the same in a direction increasing the spring pressure against said block said latch constituting the sole means preventing rotation of the keeper under the influence of a load engaged with the other arm thereof.

2. In a hitch, a body having a fork, a block carried by one of the arms of the fork and spring urged toward the base of the fork, an L-shaped keeper pivoted to the block and swingable to align either arm thereof with the block and to place the other arm in a position where it bridges the space between the arms of the fork and a latch engaging one of said arms when aligned with the block to hold the keeper against rotation and from which the keeper is releasable by bodily moving the same in a direction increasing the spring pressure against said block, the pivot connecting the keeper and block having engagement with the arm of the fork upon which the block is mounted limiting the movement of the keeper and block upon the fork.

In testimony whereof I hereunto affix my signature.

DANIEL E. MAGEE.